(12) United States Patent
Gumbula et al.

(10) Patent No.: US 9,591,083 B1
(45) Date of Patent: Mar. 7, 2017

(54) METHOD AND APPARATUS PROVIDING CONNECTION RECOVERY FOR A CHAT CLIENT

(75) Inventors: Srinivasa R. Gumbula, Freehold, NJ (US); Sumesh Madisetti, Jersey City, NJ (US)

(73) Assignee: Avaya Inc., Basking Ridge, NJ (US)

( * ) Notice: Subject to any disclaimer, the term of this patent is extended or adjusted under 35 U.S.C. 154(b) by 355 days.

(21) Appl. No.: 11/287,105

(22) Filed: Nov. 23, 2005

(51) Int. Cl.
| | | |
|---|---|---|
| G06F 15/16 | (2006.01) | |
| H04L 29/08 | (2006.01) | |
| H04L 12/26 | (2006.01) | |
| H04L 12/24 | (2006.01) | |
| H04L 29/14 | (2006.01) | |

(52) U.S. Cl.
CPC .......... *H04L 67/145* (2013.01); *H04L 41/026* (2013.01); *H04L 41/06* (2013.01); *H04L 43/10* (2013.01); *H04L 69/40* (2013.01)

(58) Field of Classification Search
CPC ....... H04L 41/026; H04L 41/06; H04L 43/10; H04L 29/08612; H04L 29/06176; H04L 67/145; H04L 69/40
USPC ................................................. 709/203, 227
See application file for complete search history.

(56) References Cited

U.S. PATENT DOCUMENTS

| | | | |
|---|---|---|---|
| 6,490,610 B1* | 12/2002 | Rizvi et al. ................... 718/101 |
| 7,085,805 B1* | 8/2006 | Ruberg et al. ................ 709/203 |
| 7,130,899 B1* | 10/2006 | Bauer et al. .................. 709/223 |
| 7,133,891 B1* | 11/2006 | Uceda-Sosa et al. ........ 709/203 |
| 7,197,548 B1* | 3/2007 | Ptasinski et al. ............. 709/223 |
| 7,302,370 B2* | 11/2007 | Nickerson et al. ............... 703/6 |
| 7,302,479 B2* | 11/2007 | Stevens et al. ............... 709/224 |
| 7,373,144 B1* | 5/2008 | Kirkpatrick et al. ......... 455/421 |
| 2002/0023143 A1* | 2/2002 | Stephenson et al. ......... 709/218 |
| 2002/0103909 A1* | 8/2002 | Devine et al. ................ 709/227 |
| 2002/0152293 A1* | 10/2002 | Hahn ................ H04L 29/12066 709/223 |
| 2003/0055994 A1* | 3/2003 | Herrmann ........... H04L 12/2856 709/229 |
| 2003/0167302 A1* | 9/2003 | Zhu et al. ..................... 709/204 |
| 2004/0210656 A1* | 10/2004 | Beck et al. ................... 709/225 |
| 2005/0108390 A1* | 5/2005 | Nickerson et al. ........... 709/224 |
| 2005/0243722 A1* | 11/2005 | Liu et al. ...................... 370/235 |
| 2006/0080130 A1* | 4/2006 | Choksi ............................. 705/1 |
| 2006/0159011 A1* | 7/2006 | Dalal et al. ................... 370/220 |
| 2006/0165066 A1* | 7/2006 | Campbell et al. ............ 370/352 |
| 2007/0005773 A1* | 1/2007 | Apreutesei et al. .......... 709/227 |
| 2008/0046568 A1* | 2/2008 | Broda et al. .................. 709/227 |
| 2008/0140846 A1* | 6/2008 | Rehm ........................... 709/227 |
| 2008/0162703 A1* | 7/2008 | Stevens et al. ............... 709/227 |

\* cited by examiner

*Primary Examiner* — Jonathan Bui

(57) ABSTRACT

A method, apparatus and computer program product for providing connection recovery for a chat client is presented. A chat session connection is established between a chat client and a server. Heartbeat messages are exchanged between the chat client and the server at predetermined time intervals. When a failure to receive a heartbeat message for longer than one of the predetermined time intervals, then a lost connection message is provided to at least one of the server and client. Messages for client are queued at the server while the connection is lost; and messages for the server are queued at the client while the connection is lost. If the connection can be re-established the queued messages are sent, otherwise the session is terminated.

14 Claims, 4 Drawing Sheets

METHOD AND APPARATUS PROVIDING CONNECTION RECOVERY FOR A CHAT CLIENT

BACKGROUND

Chat sessions have become ubiquitous. Chat sessions are a text-conferencing capability via the Internet allowing real-time communication between two users via computer. A chat session enables two or more people to use the computer as a text conferencing system. Once a chat has been initiated, either user can enter text by typing on the keyboard and the entered text will appear on the other user's monitor. Most networks and online services offer a chat feature.

The Internet Relay Chat (IRC) protocol has been designed over a number of years for use with text based conferencing. The IRC Protocol is based on the client-server model, and is well suited to running on many machines in a distributed fashion. A typical setup involves a single process (the server) forming a central point for clients (or other servers) to connect to, performing the required message delivery/multiplexing and other functions.

The server forms the backbone of IRC as it is the only component of the protocol which is able to link all the other components together: it provides a point to which clients may connect to talk to each other, and a point for other servers to connect to. The server is also responsible for providing the basic services defined by the IRC protocol.

A client is anything connecting to a server that is not another server. There are two types of clients which both serve a different purpose. User Clients are generally programs providing a text-based interface that is used to communicate interactively via IRC. Unlike users, service clients are not intended to be used manually nor for talking. They have a more limited access to the chat functions of the protocol, while optionally having access to more private data from the servers. Services are typically automatons used to provide some kind of service (not necessarily related to IRC itself) to users. An example is a service collecting statistics about the origin of users connected on the IRC network.

To be able to exchange messages, two clients must be able to locate each other. Upon connecting to a server, a client registers using a label that is then used by other servers and clients to know where the client is located. Servers are responsible for keeping track of all the labels being used. The IRC protocol provides no mean for two clients to directly communicate. All communication between clients is relayed by the server(s).

SUMMARY

Conventional mechanisms for providing chat connections and sessions such as those explained above suffer from a variety of deficiencies. One such deficiency is that conventional solutions available today do not transparently recover a lost Hyper-Text transmission Protocol (HTTP) connection between the server and the client, nor notify the status of the connection to the parties involved. The solutions available today do not provide transparent recovery or near real-time time feedback. One conventional method provides a chat recovery upon a manual reload of the chat client.

Embodiments of the invention significantly overcome such deficiencies and provide mechanisms and techniques that provide a method of providing connection recovery for a chat client. This includes recovery of the communication failures between the client running in the Internet browser and the backend server component hosted in the web server.

Particular embodiments of the presently described method of providing connection recovery for a chat client notify both the agent and the customer that the client connection has been lost and will try to reconnect automatically. Once the connection is reestablished both the agent and the customer are notified with the reconnect message and can carry on with the chat without any manual intervention. The methodology also takes care of missed poll intervals due to network latency or intermittent network glitch or any other unknown exceptions while submitting requests to the server by the client. If an interruption occurs due to a scripting error or customer inadvertently moving away from the chat hosting website, the framework detects that this particular client has not polled within the specified heartbeat interval and will feed appropriate messages to the agent notifying that the client has lost connection to the server and is currently unavailable. Meanwhile all the messages intended for the client to server or server to client are queued on the client and server respectively and are received by the client and server when the connection is established again.

In a particular embodiment of a method of providing connection recovery for a chat client, the method begins by establishing a chat session connection between a chat client and a server. Heartbeat messages are exchanged between the chat client and the server at predetermined time intervals. When a failure to receive a heartbeat message for longer than one of the predetermined time intervals is detected, then a lost connection message is provided to at least one of the server and client. Messages for client are queued at the server while the connection is lost, and messages for the server are queued at the client while the connection is lost. If the connection can be re-established the queued messages are sent, otherwise the session is terminated.

Other embodiments include a computer readable medium having computer readable code thereon for providing connection recovery for a chat client. The medium includes instructions for establishing a chat session connection between a chat client and a server. The medium also includes instructions for exchanging heartbeat messages between the chat client and the server at predetermined time intervals. The medium further includes instructions for detecting a failure to receive a heartbeat message for longer than one of the predetermined time intervals and instructions for providing a lost connection message to at least one of the server and the client. Additionally, the medium includes instructions for queuing messages for the client at the server while the connection is lost and instructions for queuing messages for the server at the client while the connection is lost. The medium further includes instructions wherein if the connection can be re-established the queued messages are sent, otherwise the session is terminated.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides connection recovery for a chat client as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing connection recovery for a chat client as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers. At least two computers are needed one for server and CRM chat agent and the other for the client running browser)

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
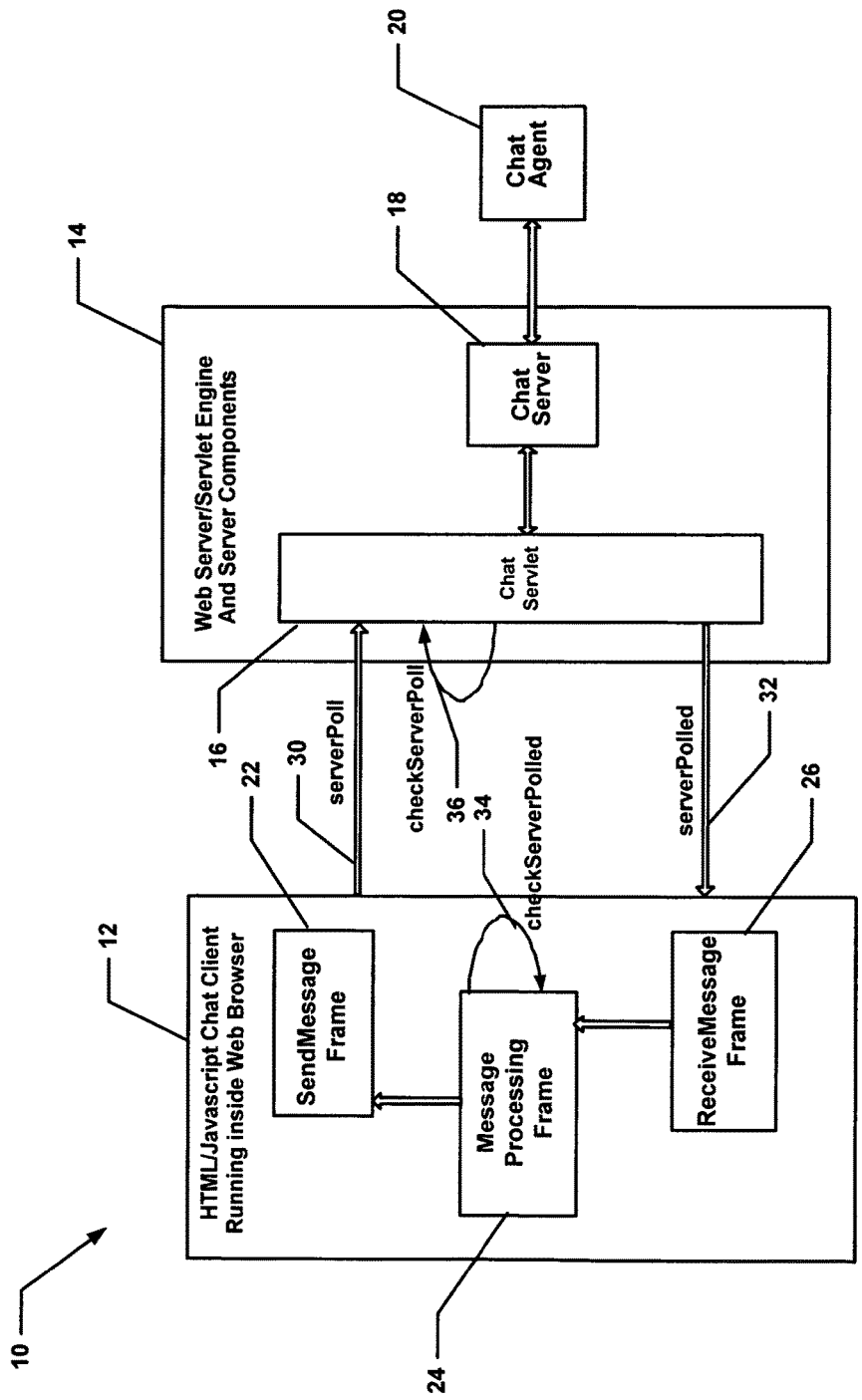
FIG. 1 illustrates a block diagram of a system providing connection recovery for a chat client in accordance with embodiments of the invention.

Referring now to FIG. 1, a particular embodiment of an environment 10 which provides connection recovery for a chat session is shown. The system includes a chat client 12, in this embodiment realized as an HTML/JavaScript chat client running inside a browser. The client 12 is shown including a SendMessage frame 22, a Message Processing Frame 24 and a ReceiveMessage frame 26. The SendMessage frame 22 is a hidden frame which is used by the Message Processing Frame 24 to send the messages. The Message Processing Frame 24 is a hidden frame that contains the logic of sending, receiving and processing messages. The ReceiveMessage frame 26 is a hidden frame which is used by the Message Processing Frame 24 to receive the message and for the Chat Servlet 18 to write the callback messages.

The client 12 is in communication with a server 14, realized in this embodiment as a web server/servlet engine and further including server components. The server components include a Chat Servlet 16 in communication with a Chat Server 18. Also shown is a Chat Agent 20 in communication with the Chat Server 18. The Chat Servlet 16 performs the server side tasks and acts as a proxy between the client 12 and the Chat Server 18. The Chat Server 18 hosts the chat room and maintains the state and various statistics of a chat. The Chat Agent 20 is a client application for a real agent.

In a particular example, a mechanism is provided wherein a Chat Client 12 and a Chat Servlet 16 running inside the Servlet Engine 14 exchange heartbeat messages during a configurable poll interval. Both the client 12 and server 14 component are configured to check for the heartbeat messages every configurable check interval (greater than a poll interval). The heartbeat mechanism happens in two hidden frames namely tunnsend (e.g., SendMessage Frame 22) and tunnreceive (e.g., ReceiveMessage Frame 26) keeping the mechanism transparent to the client.

A poll message (e.g., serverPoll 30) sent from the client 12 to the server 14 results is a response where the hidden frame gets a serverPolled 32 JavaScript function callback. The client keeps checking for the serverPolled message 32 for every configured check interval (checkServerPolled 34), similarly the server component 14 checks for successful client poll message for every configured check interval (checkServerPoll 36). If either client 12 or the server component 14 does not see a heartbeat message during the check interval then the client 12 displays the message "Lost connection to the server, retrying . . . " and the server component 14 sends a message to the agent 20 "Client has lost connection to the server, retrying . . . ".

The chat customer client 12 and chat agent 20 are now both aware of the communication issue. During this period (where the chat client 12 and the chat agent 20 have lost communication) any chat messages sent by the customer are queued up on the chat client 12 and any messages sent by the agent 20 are queued up on the server component 14 side.

When the connection loss is realized by the client 12 a hidden frame keeps retrying the connection every configurable reconnect interval by sending a serverPoll message 30 and checking for serverPolled message 32. The number of attempts made by the client 12 to retrieve the connection is limited by a configurable disconnect interval (which may be measured from the time when the connection is lost). The connection is recovered if the client receives a successful serverPolled message 32. If the connection is not recovered within the disconnect interval then both the chat client 12 and the agent client 20 are notified that the chat customer has disconnected and the chat call is disconnected. All the parameters are configurable thus providing great flexibility in solving communication issues related to slow and/or malfunctioning networks.

Figure 2A:
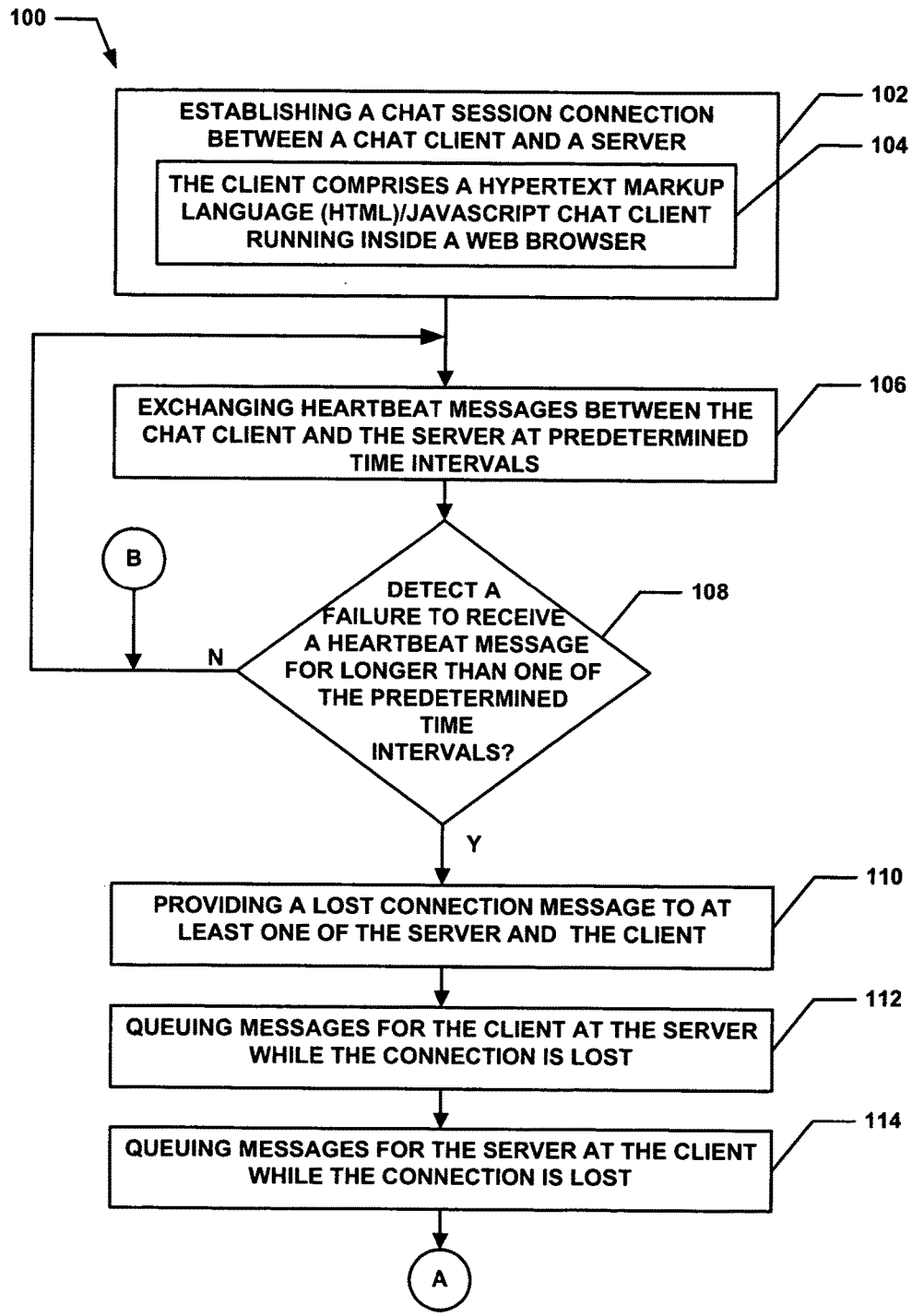
FIGS. 2A and 2B illustrate flow diagrams of a particular embodiment of a method of providing connection recovery for a chat client.
Figure 2B:
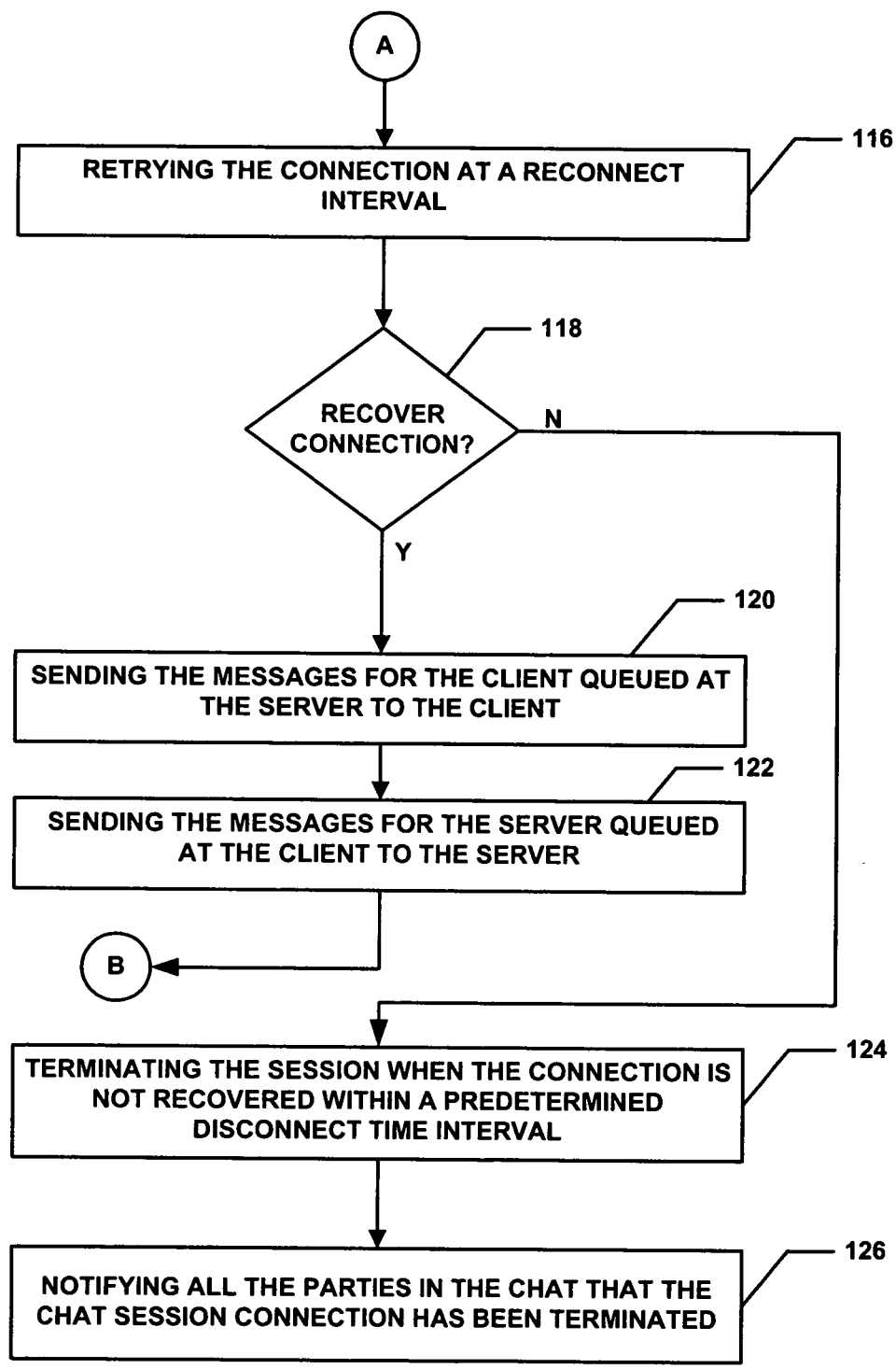

A flow chart of a particular embodiment of the presently disclosed method is depicted in FIGS. 2A and 2B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of providing connection recovery for a chat client is shown. The method 100 begins with processing block 102 wherein a chat session connection is established between a chat client and a server. In a particular embodiment, as shown in processing block 104, the client comprises a Hypertext Markup Language (HTML)/JavaScript chat client running inside a web browser.

Processing block 106 discloses exchanging heartbeat messages between the chat client and the server at predetermined time intervals. The time interval is preferably equal to poll interval.

At decision block 108 a determination is made regarding whether there was a failure to detect a heartbeat message for longer than one of the predetermined time intervals. When there was not a failure to detect a heartbeat message processing continues at processing block 106. On the other hand, when there is a failure to detect a heartbeat message for longer than the predetermined time interval, then processing continues at processing block 110.

At processing block 110, a lost connection message is provided to at least one of the server and the client, and preferably to both. At processing block 112, messages for the client are queued at the server while the connection is lost. Similarly, in processing block 114, messages for the server are queued at the client while the connection is lost.

Processing block 116 recites retrying the connection at a reconnect interval. The reconnect interval may be set to an appropriate value to compensate for network conditions.

At decision block 118, a determination is made regarding whether the session connection has been recovered. When the connection is recovered, processing continues at processing block 120. When the attempt to recover the session connection fails, processing continues at processing block 124.

At processing block 120, when the connection is recovered, any messages for the client which have been queued at the server are sent to the client. Similarly, at processing block 122, any messages for the server which have been queued at the client are sent to the server. Processing then continues at processing block 106 et seq.

At processing block 124, when the attempt to recover the session connection fails, when the connection is not recovered within a predetermined disconnect time interval the session is terminated. The predetermined disconnect time interval can be adjusted to account for slow and/or malfunctioning networks. At processing block 126, all the parties involved in the chat session are notified that the chat session connection has been terminated.

Figure 3:
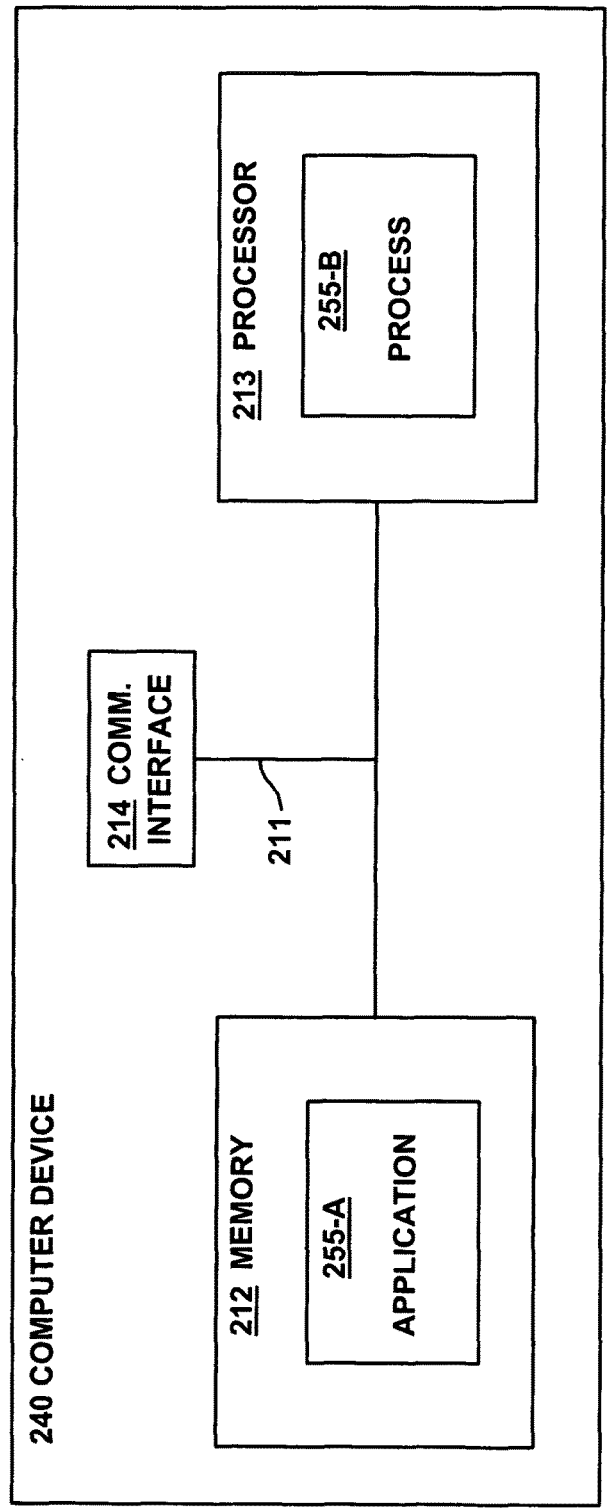
FIG. 3 illustrates an example computer device architecture for a computer device that performs connection recovery for a chat client in accordance with embodiments of the invention.

FIG. 3 illustrates example architectures of a computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system running a chat client performs operations providing connection recovery, the method comprising:
   requesting by said computer system a chat session connection with a server;
   sending, from said computer system, heartbeat messages from the computer system to said server at a predetermined time interval in a first hidden frame, keeping the heartbeat messages transparent from said chat client, wherein said sending heartbeat messages comprises sending, by said computer system, a serverPoll message to said server;
   receiving a return heartbeat message from the server in response to each of the heartbeat messages sent from the computer system, wherein the return heartbeat message comprises a serverPolled function callback in a second hidden frame;
   detecting, by said computer system, a failure to receive a serverPolled function callback for longer than one of said predetermined time intervals, indicating said chat client connection is lost; and
   queuing messages at said computer system while said chat session connection is lost.

2. The method of claim 1 further comprising, in response to said failure to receive a serverPolled function callback, said computer system retrying the connection at a reconnect interval.

3. The method of claim 2 further comprising:
   when said retrying the chat session connection is successful, said computer system sending said messages queued at said computer system to said server.

4. The method of claim 2 further comprising said computer system terminating said session when said chat session connection is not recovered within a predetermined disconnect time interval.

5. A non-transitory computer readable storage medium having computer readable code embodied therewith, the computer readable program code comprising:
   computer readable program code configured to provide requesting by said computer system a chat session connection with a server;
   computer readable program code configured to provide sending, from said computer system, heartbeat messages from the computer system to said server at a predetermined time interval in a first hidden frame, keeping the heartbeat messages transparent from said chat client, wherein said sending heartbeat messages comprises sending, by said computer system, a serverPoll message to said server;
   computer readable program code configured to provide receiving a return heartbeat message from the server in response to each of the heartbeat messages sent from the computer system, wherein the return heartbeat message comprises a serverPolled function callback in a second hidden frame;
   computer readable program code configured to provide detecting, by said computer system, a failure to receive a serverPolled function callback for longer than one of said predetermined time intervals, indicating said chat client connection is lost; and
   computer readable program code configured to provide queuing messages at said computer system while said chat session connection is lost.

6. The non-transitory computer readable storage medium of claim 5 further comprising computer readable program code configured to provide, in response to said failure to receive a serverPolled function callback, retrying the connection at a reconnect interval.

7. The non-transitory computer readable storage medium of claim 6 further comprising computer readable program code configured to provide:
   said computer system recovering said connection; and
   said computer system sending said messages queued at said computer system to said server.

8. The non-transitory computer readable medium of claim 6 further comprising computer readable program code configured to provide said computer system terminating said session when said chat session connection is not recovered within a predetermined disconnect time interval.

9. A computer system running a chat client, said computer system comprising:
   a memory;
   a processor;
   a communications interface;
   an interconnection mechanism coupling the memory, the processor and the communications interface; and
   wherein the memory is encoded with a connection recovery process for a chat client application that when performed on the processor, provides a process for processing information, the process causing the computer system to perform the operations comprising:
   requesting by said computer system a chat session connection with a server;
   sending, from said computer system, heartbeat messages from the computer system to said server at a predetermined time interval in a first hidden frame, keeping the heartbeat messages transparent from said chat client, wherein said sending heartbeat messages comprises sending, by said computer system, a serverPoll message to said server;
   receiving a return heartbeat message from the server in response to each of the heartbeat messages sent from the computer system, wherein the return heartbeat message comprises a serverPolled function callback in a second hidden frame;
   detecting, by said computer system, a failure to receive a serverPolled function callback for longer than one of said predetermined time intervals, indicating said chat client connection is lost; and
   queuing messages at said computer system while said chat session connection is lost.

10. The computer system of claim 9 wherein the computer system further performs the operation of, in response to said failure to receive a serverPolled function callback, said computer system retrying the connection at a reconnect interval.

11. The computer system of claim 10 wherein the computer system further performs the operations of recovering said connection; and
   said computer system sending said messages queued at said computer system to said server.

12. The computer system of claim 10 wherein the computer system further performs the operations of terminating said session when said chat session connection is not recovered within a predetermined disconnect time interval.

13. The method of claim 1 wherein said predetermined time interval is configurable in order to provide flexibility in solving communication issues related to a malfunctioning network.

14. The non-transitory computer readable medium of claim 5 wherein said predetermined time interval is configurable in order to provide flexibility in solving communication issues related to a malfunctioning network.

\* \* \* \* \*

UNITED STATES PATENT AND TRADEMARK OFFICE
CERTIFICATE OF CORRECTION

| | | |
|---|---|---|
| PATENT NO. | : 9,591,083 B1 | Page 1 of 1 |
| APPLICATION NO. | : 11/287105 | |
| DATED | : March 7, 2017 | |
| INVENTOR(S) | : Gumbula et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this
Eighth Day of May, 2018

Andrei Iancu
*Director of the United States Patent and Trademark Office*